UNITED STATES PATENT OFFICE.

ARTHUR L. BROWN, OF WILKINSBURG, PENNSYLVANIA, ASSIGNOR TO WESTINGHOUSE ELECTRIC AND MANUFACTURING COMPANY, A CORPORATION OF PENNSYLVANIA.

TREATMENT OF HYDROCARBON OILS.

1,234,862.   Specification of Letters Patent.   Patented July 31, 1917.

No Drawing.   Application filed August 6, 1915.   Serial No. 43,993.

*To all whom it may concern:*

Be it known that I, ARTHUR L. BROWN, a citizen of the United States, and a resident of Wilkinsburg, in the county of Allegheny and State of Pennsylvania, have invented a new and useful Improvement in Treatment of Hydrocarbon Oils, of which the following is a specification.

My invention relates to the treatment of hydrocarbon oils, particularly to the treatment of mineral oils composed mainly of hydrocarbons of the paraffin series, and it has for its object to provide a method of retarding or entirely preventing the formation of sediment in such oils.

When hydrocarbon oils are exposed to the air, they slowly develop a dark sediment or sludge which appears to result from a slight oxidation of the oil. When such oils are used for cooling purposes, as in the tanks of electric transformers, the sediment may accumulate upon the walls of the container and cooling coils to such an extent as to greatly interfere with the dissipation of heat.

I have discovered that the formation of sediment in hydrocarbon oils may be prevented by the presence of small amounts of phosphorus. I prefer to employ the amorphous or red phosphorus, and only a small fraction of one per cent. of the weight of the oil is necessary to accomplish the desired result.

The phosphorus may be mixed with the oil, or it may be made into a paste with glue or other suitable binder and painted upon the inner walls of the containers that are to receive the oil. The oil appears to have little or no solvent effect on the phosphorus, although it is possible that small amounts of liquid resinous compounds are formed.

I have found that the present process gives good results in the treatment of the cooling oils known as transformer oils, which are somewhat similar to kerosene but are somewhat heavier and have higher flashing points. In the treatment of such oils I find it sufficient to employ the red phosphorus in the proportion from 0.1% to 0.2% of the weight of the oil. I have found that transformer oil treated with red phosphorus in the above proportions may be exposed, in an uncovered vessel, to a temperature of 100° C. for several weeks without the formation of sludge and with only a slight darkening of the oil. Untreated oil, under the same conditions, darkens in a few days to such an extent that it is no longer transparent and is nearly black in color.

My invention is neither restricted to the treatment of any particular class of hydrocarbon oils nor are any limitations to be imposed upon my invention except such as are indicated in the appended claims.

I claim as my invention:

1. The method of preventing the formation of sediment in hydrocarbon oil that comprises treating such oil with phosphorus.

2. The method of preventing the formation of sediment in hydrocarbon oil that comprises treating such oil with red phosphorus.

3. The method of preventing the formation of sediment in hydrocarbon oil that comprises adding red phosphorus thereto.

4. The method of preventing the formation of sediment in hydrocarbon oil that comprises adding thereto not over 0.2% of its weight of red phosphorus.

5. The method of preventing the formation of sediment in hydrocarbon oil that comprises adding thereto from 0.1% to 0.2% of its weight of red phosphorus.

6. The method of preventing the formation of sediment in hydrocarbon oil that comprises placing the oil in contact with a surface provided with a coating containing free phosphorus.

7. The method of preventing the formation of sediment in hydrocarbon oil that comprises placing the oil in contact with a surface provided with a coating containing red phosphorus and a binder.

In testimony whereof, I have hereunto subscribed my name this 22nd day of July, 1915.

ARTHUR L. BROWN.